Figure 2A:
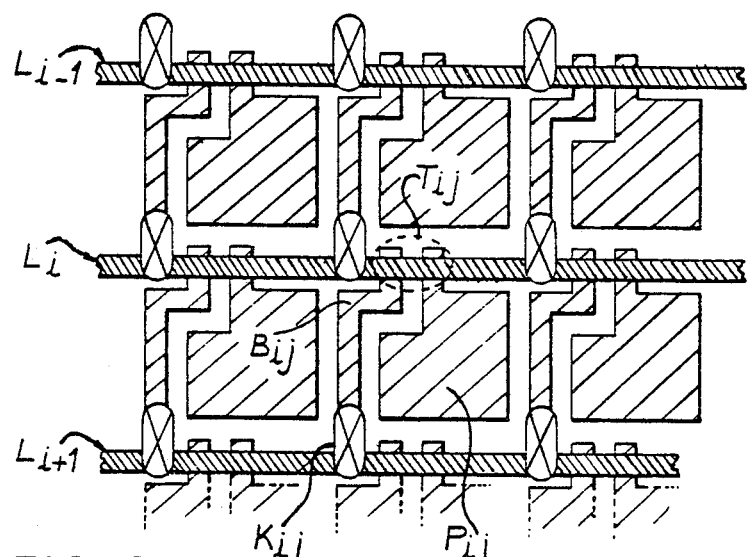

United States Patent [19]

Maurice

[11] Patent Number: 4,792,210
[45] Date of Patent: Dec. 20, 1988

[54] ACTIVE MATRIX DISPLAY SCREEN WITH TRANSISTOR SOURCES CONNECTED TO ADJACENT ADDRESSING LINES AND PROCESSES FOR MAKING THIS SCREEN

[76] Inventor: François Maurice, 125 Boulevard de la Corniche, 22700 Perros Guirec, France

[21] Appl. No.: 7,081

[22] Filed: Jan. 27, 1987

[30] Foreign Application Priority Data

Jan. 27, 1986 [FR] France ............................... 86 01084

[51] Int. Cl.[4] .................... G02F 1/133; G09G 3/36
[52] U.S. Cl. .................................. 350/334; 350/333; 156/651; 156/652; 156/656; 156/659.1; 156/661.1; 437/50; 437/60; 437/181; 437/193; 437/194; 437/195; 340/784; 357/23.7
[58] Field of Search .............. 350/332, 333, 334, 336; 340/784, 713; 357/41, 45, 23.7, 51; 156/651, 661.1, 656, 659.1, 652; 427/259, 404, 419.2, 108, 123, 165; 437/50, 60, 193–195

[56] References Cited

U.S. PATENT DOCUMENTS

| | | | |
|---|---|---|---|
| 4,062,626 | 12/1977 | Kawakami et al. | 350/333 |
| 4,368,523 | 1/1983 | Kawate | 340/784 |
| 4,395,736 | 7/1983 | Fraleusc | 357/45 |
| 4,545,112 | 10/1985 | Holmberg et al. | 357/23.7 |
| 4,563,806 | 1/1986 | Coissard et al. | 437/54 |
| 4,678,282 | 7/1987 | Yaniv et al. | 350/334 |
| 4,680,580 | 7/1987 | Kawahara | 340/784 |
| 4,689,116 | 8/1987 | Coissard et al. | 350/333 |
| 4,694,287 | 9/1987 | Chenevas-Paule et al. | 340/784 |
| 4,697,331 | 10/1987 | Boulitrop et al. | 350/336 |
| 4,738,749 | 4/1988 | Maurice et al. | 350/333 |

FOREIGN PATENT DOCUMENTS

| | | | |
|---|---|---|---|
| 0145520 | 6/1985 | European Pat. Off. | 340/719 |
| 0176763 | 4/1986 | European Pat. Off. | 350/334 |

Primary Examiner—Stanley D. Miller
Assistant Examiner—Tai Van Duong
Attorney, Agent, or Firm—Oblon, Fisher, Spivak, McClelland, & Maier

[57] ABSTRACT

Active matrix display screen and processes for making it. The sources of transistors Tij controlling the display points belonging to a line Li are connected to the following line Li+1 by a resistive strip Bij and a conductive bridge Kij. If a transistor is defective and short-circuited, this defect does not affect the adjacent transistors.

7 Claims, 7 Drawing Sheets

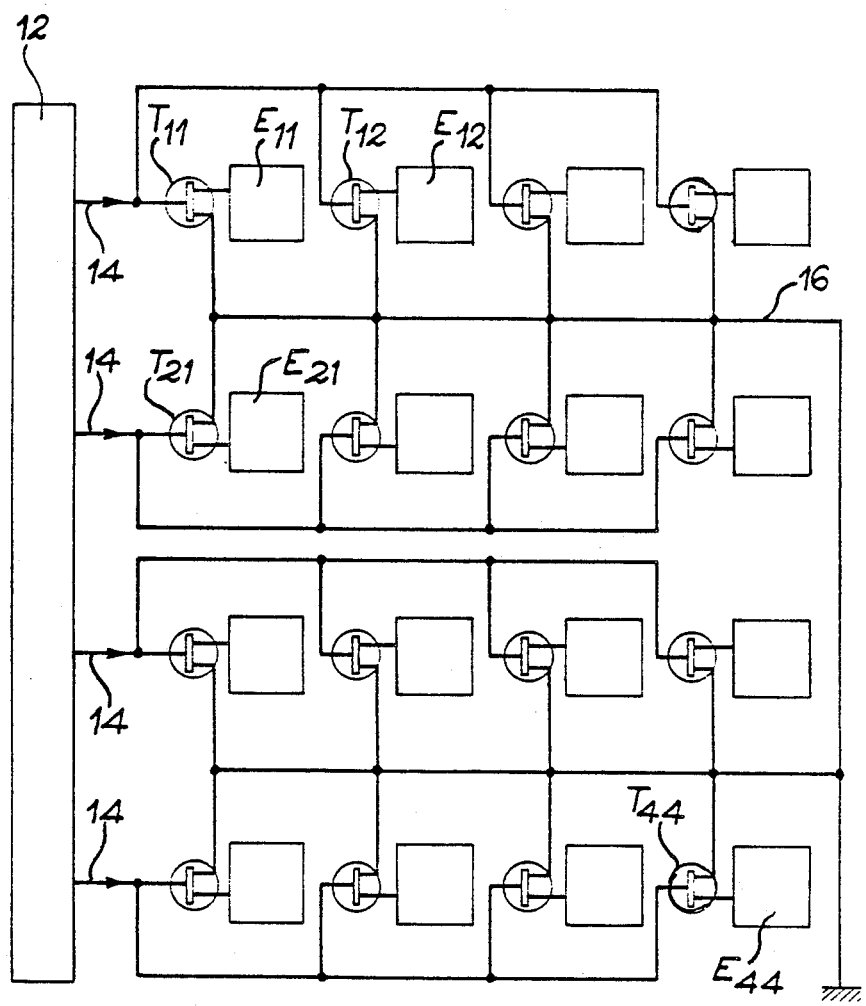
FIG. 1 *PRIOR ART*

ACTIVE MATRIX DISPLAY SCREEN WITH TRANSISTOR SOURCES CONNECTED TO ADJACENT ADDRESSING LINES AND PROCESSES FOR MAKING THIS SCREEN

This invention has as its object an active matrix display screen and processes for making this screen.

Generally, an active matrix display screen consists of picture points (also called "pixels") arranged in matrix form and located at the intersections of addressing lines and columns. Each picture point comprises a thin-film transistor (TFT for short) and a capacitor. The capacitor plates of this capacitor consist of a conductive block placed on one of the plates of the cell and of a counter-electrode placed on the other plate of the cell.

French patent application FR-A-No. 2 533 072 describes a device of this type. On one of the plates of the screen are deposited transparent conductive blocks each connected to an appendix and each forming one of the capacitor blocks of the capacitor. On this plate are also deposited conductive lines and columns. The lines pass over the appendices of the blocks and intersect the conductive columns. The covering zones of a line respectively with a column and an appendix, define the source and the drain of a TFT. The gate of this transistor consists of the part of the line which is located between the appendix and the column conductor.

On the other plate of the screen is deposited a transparent conductive material forming the other capacitor plate of the capacitors.

The drawback of this type of device is that at each intersection of a line and a column, it is necessary to assure an electric insulation between the conductors. Now, this constitutes a difficult technological problem. Short circuits can occur at these intersections, which renders the display screen partly unusable.

To solve this problem, French patent application FR-A-No. 2 553 218 proposes an active matrix display screen without intersection of addressing columns and lines, thanks to an arrangement which is represented in FIG. 1. One of these two plates of the display screen consists of a matrix of conductive blocks $E_{11}$, $E_{12}$, ..., transistors $T_{11}$, $T_{12}$, etc., control lines 14 and reference lines 16. The gates of all the transistors of the same line are connected to the same line 14. A circuit 12 controls the lines sequential. The source of each transistor is connected to the reference lines brought to a constant reference potential Vs. The second plate of the display screen (not shown in the figure), carries conductors placed in columns and that receive a control video voltage. These column conductors comprise conductive blocks placed opposite the blocks carried by the first plate. A picture point or pixel is then defined by the covering zone of two conductive blocks located opposite one another.

In such a display screen, the short circuits between addressing lines and columns are indeed eliminated, since these lines and these columns are on two different plates, separated from on another by the liquid crystal. Nevertheless, there still exist risks of short circuit in the TFT, which can damage a line of picture points. Actually, with reference to FIG. 1, it is seen that during a short circuit between the gate and the source of a transistor, an entire line will be brought to potential Vs, which renders an entire line of pixels defective.

This invention has precisely the aim of remedying this drawback. For this purpose, it specifies connecting the source of a transistor, whose gate is connected to a certain line, to the following line, and this by a resistance.

Under these conditions, the reference line of the prior art is eliminated and there exists only one control line per line of pixels. Moreover, if a transistor is short-circuited, it in no way interferes with the operation of the other transistors.

Figure 2B:
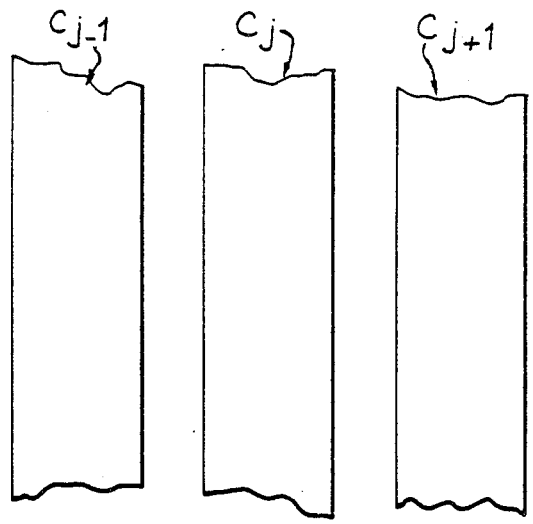
Figure 3:
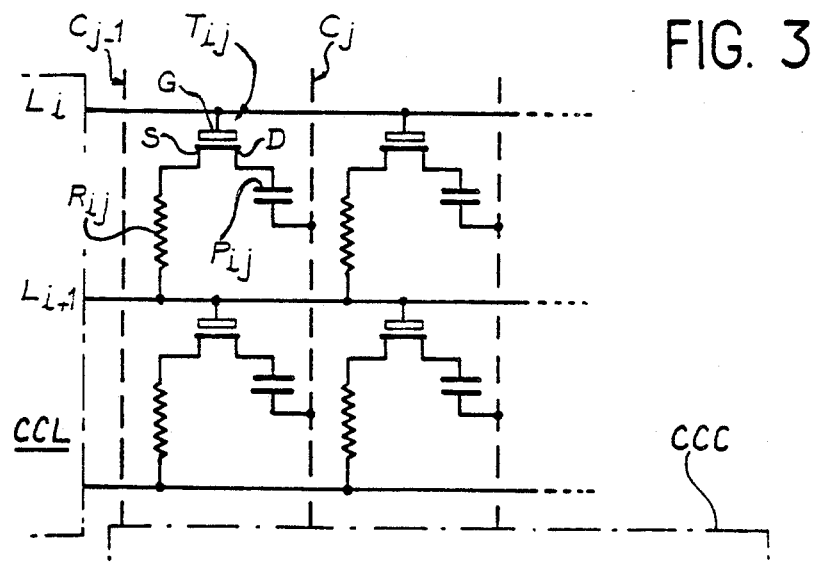
Figure 4:
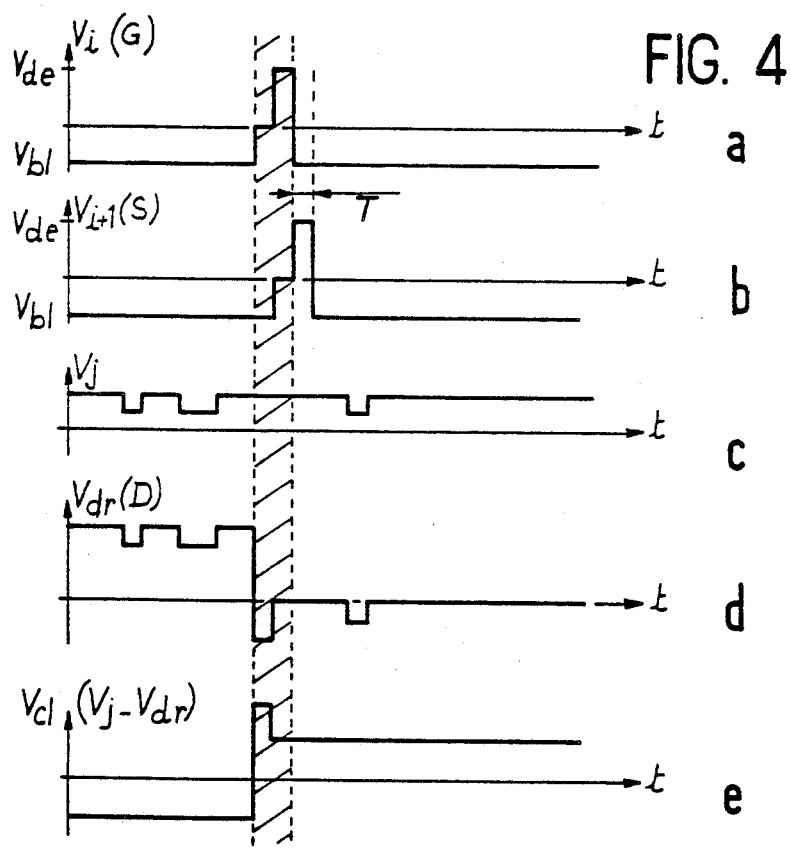
Figure 5:
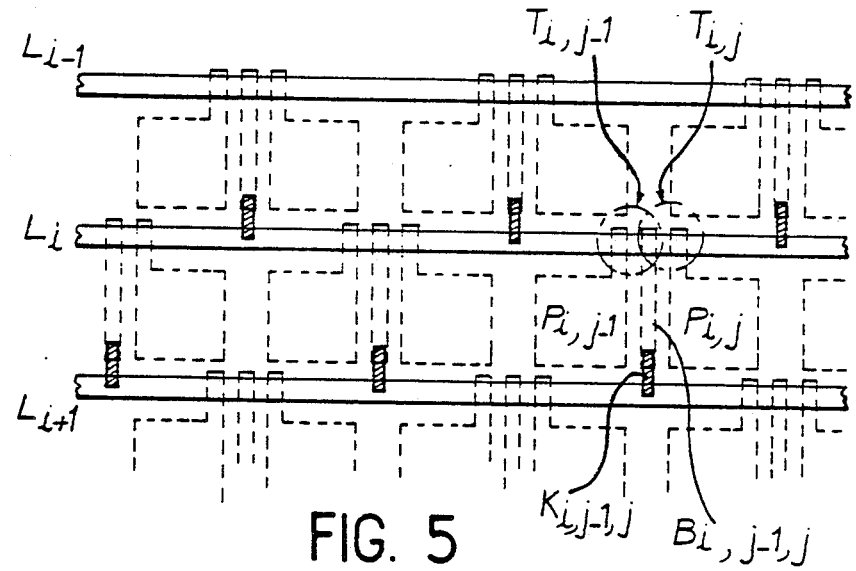
Figure 6:
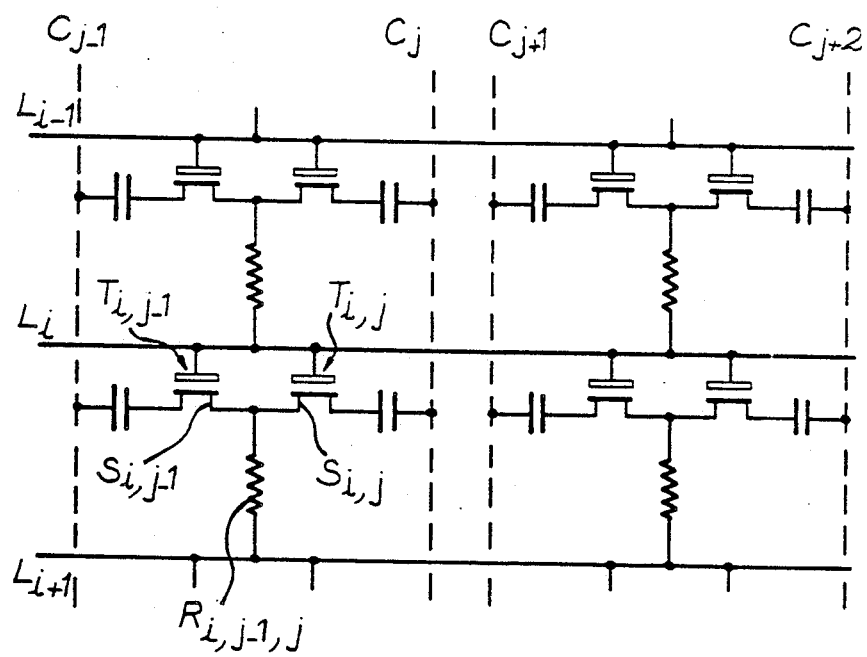
Figure 7:
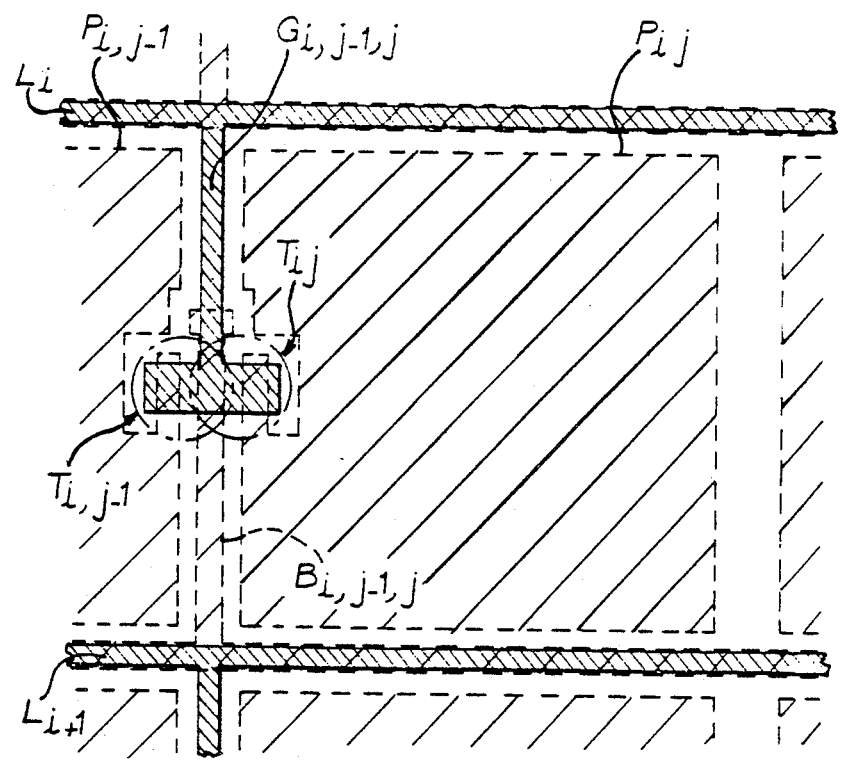
Figure 11:
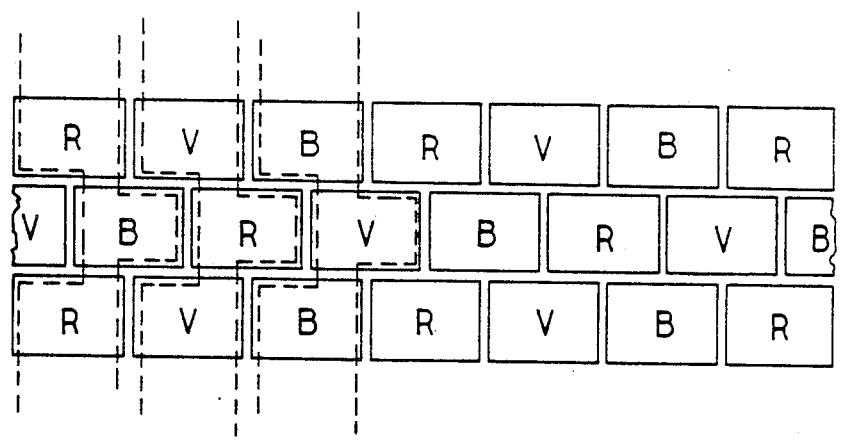
Figure 8:
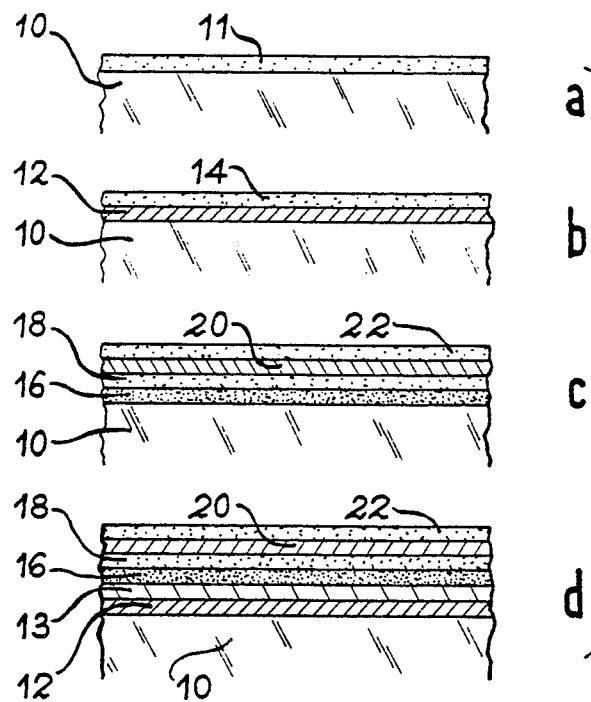
Figure 9:
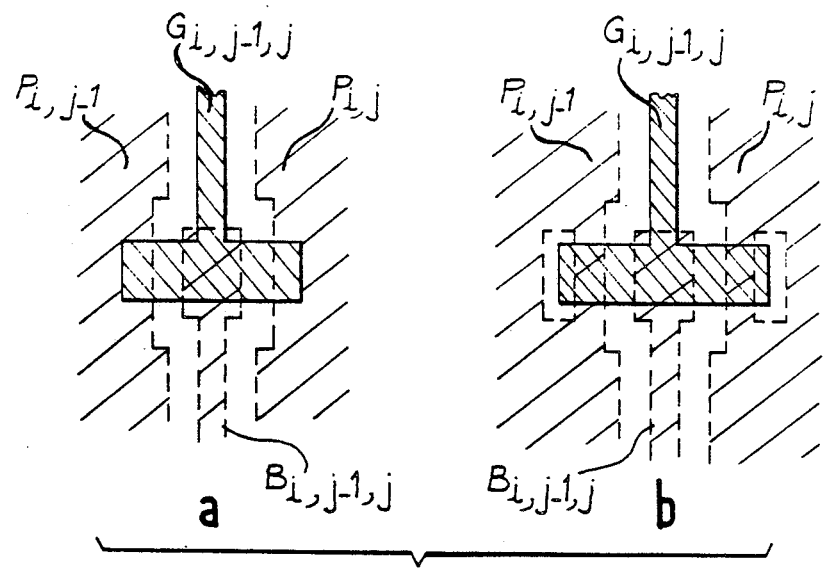
Figure 10:
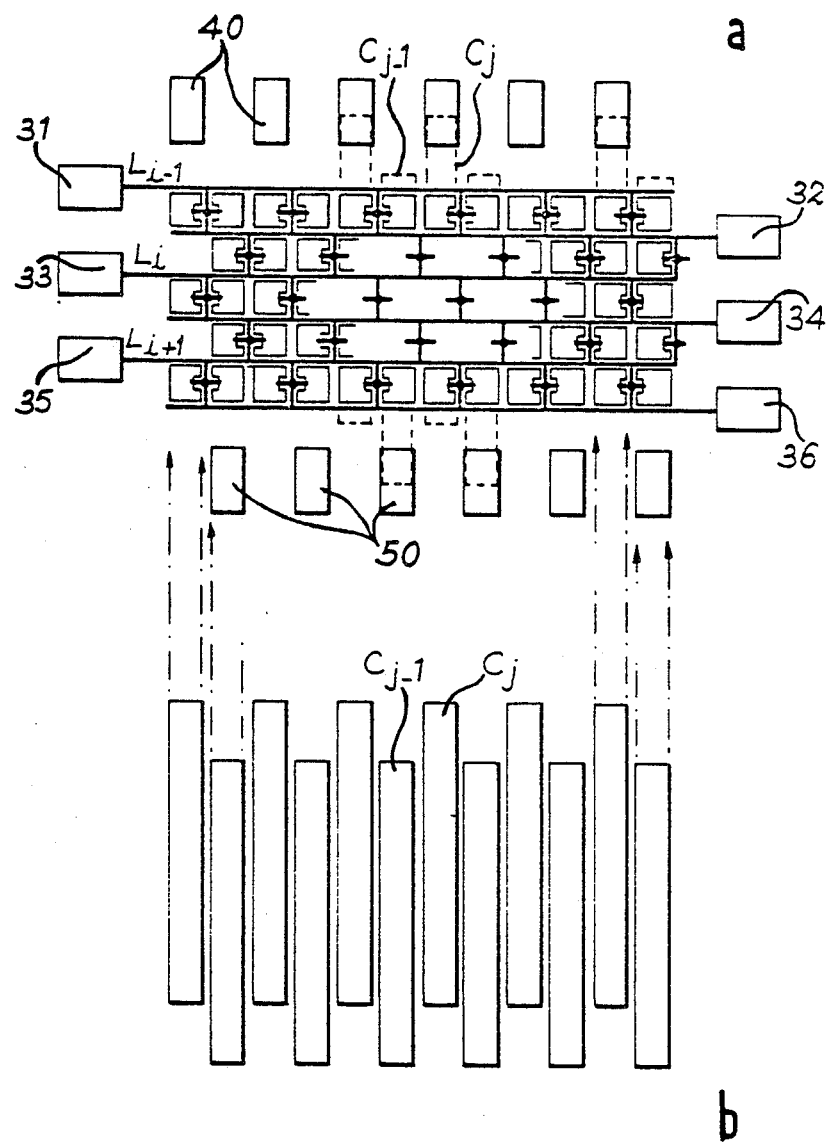

In any case, the characteristics and advantages of the invention will appear better in light of the following description of examples of embodiment given by way of explanation and in no way limiting. This description refers to accompanying drawings in which:

FIG. 1, already described, represents an active matrix display screen according to the prior art, FIGS. 2a and 2b represent, diagrammatically, a display screen according to the invention, FIG. 3 represents an equivalent electrical diagram, FIG. 4 represents a series of voltages appearing at various points of the screen, FIG. 5 represents a particular embodiment of the invention, FIG. 6 represents an equivalent diagram corresponding the embodiment of the preceding figure, FIG. 7 shows a detail of the screen in a first variant, FIG. 8 shows, in section, the structure of the first plate a various places, FIG. 9 further shows two variant embodiments of the transistors, FIG. 10 shows the general shape of the two plates of a screen according to the invention, FIG. 11 shows a particular arrangement of the display points, in the case of a color display.

In FIG. 2a, there is seen an indented conductive block Pij provided with a rectangular appendix in the upper part, a conductive strip Bij taking the shape of the indentation, running along the block and ending at the top of the appendix, and various addressing lines, Li−1, Li, Li+1. Line Li overlaps the upper end of strip Bij and the appendix connected to the block. This line forms, in this covering zone, a thin-film transistor Tij. Finally, a conductive bridge Kij is seen which connects the lower end of strip Bij to line Li+1.

In FIG. 2b, columns Cj−1, Cj, Cj+1 are seen which, when the two plates are superposed, cover the columns of blocks.

FIG. 3 represents an equivalent electrical diagram corresponding to the device of FIGS. 2a and 2b. Transistor Tij comprises a gate G, a drain D and a source S. The gate is connected to line Li, the drain to the capacitor plate constituted by block Pij, the other capacitor plate being connected to column Cj. The source is connected to line Li+1 by a resistance Rij. Moreover, lines Li are connected to a line control circuit CCL and columns Cj to a column control circuit CCC.

With such a structure, if a transistor exhibits a gate-source short circuit, resistance Rij prevents any short circuit between lines Li and Li+1. A gate-drain short circuit no longer short-circuits the line and the column because of the galvanic insulation obtained by the display capacitor; finally, a line-column short circuit is impossible because these lines and these columns ar physically separate since they belong to two different plates.

With such a structure, the voltage applied to line Li+1 should be connected to the voltage applied to line Li, so that transistor Tij is correctly fed during the display of all the picture elements of line Li. An example of control voltage is represented in FIG. 4. These voltages correspond to the particular case where the transistor is of n-channel amorphous silicon, which corresponds to a positive threshold voltage. On line a is seen the voltage applied to line Li, i.e., in short, to gates G of the transistors connected to this line. This voltage is at first negative and equal to a value Vb1, then equal to 0, then equal to a positive voltage Vde, then it returns to value Vb1. The voltage applied to the following line Li+1 exhibits the same form, but is shifted by a period T equal to the total control time of the screen divided by the number of lines. This voltage is that of the sources of the transistors connected to line Li+1.

As long as the source and the gate of the transistor are at the same potential and as long as this potential is less than the drain voltage, the transistor is blocked. When the gate voltage becomes greater than the source voltage, the transistor becomes conductive. This is diagrammed in FIG. 4 by the hachured column. When the transistor is blocked, the drain is insulated and its potential follows the potential of the associated column. The voltage applied to column Vj is represented on line c and the drain potential on line d. When the transistor is conductive, the drain potential becomes equal to the source potential. To know the excitation applied to the liquid crystal, it is necessary to determine the difference in potential of the two capacitor plates of the capacitor, i.e., in short, the difference between the potential of column Vj and the potential of drain Vdr. This is represented on the last line e in the form of voltage Vc1. It is seen that this voltage is established continuously on the control point corresponding to lie Li and to column Cj and that, in addition, this voltage is of alternating polarity, sometimes negative (for one pattern), sometimes positive (for the following pattern). This arrangement is common in liquid crystal display screens. It is intended to avoid the spurious effects of charge accumulation which would be harmful to the liquid crystal.

So that the resistance which connects the source to the line does not disturb the operation of the control circuits, this resistance must be much greater than the output impedance of said circuits. Moreover, so that this resistance does not change the behavior of the transistor too much, it must be much less than the resistance of the transistor when the transistor is conductive. Examples of resistances will be given later.

Voltages of lines more complex than those which are represented in figure can be conceived to avoid placing the transistor in danger. Actually, if Vmax is the absolute value of the greatest voltage Vc1, it can be shown that drain potential Vdr takes its values over a range of width 4 Vmax. Since voltage Vmax can reach 7 V, voltage Vdr could therefore reach about 30 V, which is considerable. More sophisticated line voltages can then be conceived, at more than three levels (for example, 4 or 6), which limit this value.

In FIG. 5 is seen a variant embodiment in which the transistors and the blocks are mounted symmetrically, two by two. More specifically, blocks Pi,j and Pi,j−1 are turned so that their appendices are located in the left upper corner for the first and the right upper corner for the second. Transistors Ti,j−1 and Ti,j then have a common source, which is connected to line Li+1 by a single resistive strip Bi,j−1,j and a single bridge Ki,j−1,j.

The equivalent electrical diagram is represented in FIG. 6. The two transistors Ti,j−1 and Ti,j have their respective sources Si,j−1 and Si,j connected together and to the resistance Ri,j−1,j.

To achieve the structures which have just been described, a process having three masking levels can be used and it can be performed as follows:

first of all, depositing on an insulating substrate (of glass, for example) of a transparent conductive layer (for example of indium-tin oxide or ITO), a first photoengraving of this layer to define conductive blocks Pij provided with their appendix and conductive strips Bij running along each block and each appendix, depositing of a stack formed by a layer of hydrogenated amorphous silicon, a layer of insulating material and a metal layer, a second photoengraving applied to the preceding stack to form addressing lines Li overlapping one of the ends of conductive strips Bi,j and the appendices of the blocks, transistors Ti,j being constituted in these overlapping zones, depositing of a metal layer and a third photoengraving applied to this layer to allow to subsist conductive bridges Ki,j making the connection between the other end of conductive strips Bi,j and line Li+1.

In the variants which have just been illustrated, the appendices connected to the blocks are located at the upper part of these blocks, so that it is the addressing line itself which, overlapping these appendices, forms the various gates of the transistors. But these appendices can be located as well on the lateral parts of the blocks, in their median part. In this case, it is necessary to form an additional strip intended to connect the line to the gate of the transistors. This is represented in FIG. 7. Seen there are two blocks Pi,j and Pi,j−1 possessing two lateral appendices, and a strip Gi,j−1 that can be characterized as "descending," in the sense that it starts from line Li located above the blocks, descends between two blocks and terminates with an broadened end which covers the lateral appendices. Strip Bi,j−1,j can be characterized as "rising" because it starts from line Li+1 which goes under the blocks and rises between the blocks to terminate under the common gate of the transistors.

This structure exhibits a certain number of advantages, the first of which is that it can be obtained by a process having two masking levels (instead of three as in the preceding variants). These two levels appear in FIG. 7 thanks to the following convention: the zones drawn in dashes and hachured at 45° with hachures going from the top right to the bottom left correspond to the first masking level (blocks, appendices, rising strips, and lines); the zones drawn in solid line and hachured at 45° with hachures going from the top left to the bottom right correspond to the second masking level (descending strips and lines).

To achieve such a structure, the following procedure can be used:

first of all, depositing on an insulating substrate (glass, for example) of a transparent conductive layer (of ITO, for example) and of a layer of a first metal (for example, of aluminum), a first photoengraving defining blocks Pi,j, addressing lines Li and rising conductive strips Bi,j−1,j, depositing of a stack formed by a layer of hydrogenated amorphous silicon, an insulating material (for example, $SiO_2$ or $Si_3N_4$) and a second metal (for example, aluminum), the layer of hydrogenated amorphous silicon and the layer of insulating material stopping at the end of a line before the layer of the second metal, a second photoengraving applied t this stack to allow this stack to subsist on the lines and in the form of descending strips Gi,j−1,j starting from a line and overlapping the second end of the rising conductive strip, and the appendices of the blocks, this second photoengraving freeing the transparent conductive layer from the blocks and from the median part of strips Bi, J−1, J.

With such a process, addressing lines result which comprise a transparent conductive layer and two superposed metal layers in contact with one another at the end of a line. This redundant structure makes it possible to reduce considerably the dangers of breaking lines. Actually, even if there is a break of one of the metal layers, one or the other of the two other layers will assure an equipotential state on the entire line.

FIG. 8 makes it possible to specify this structure further. It involves sections made in various zones of the first plate. Section a corresponds to the zones where there is no conductive deposit, i.e., between the lines and the blocks; a substrate 10 covered with a passivation layer 11 is seen there. Section b is made above the blocks: it show substrate 10, a layer 12 of ITO and a passivation layer 14 (for example, of $SiO_2$). Section c is made in the zone of the channel of the transistors: it shows substrate 10, a layer 16 of aSI:H, a layer 18 of gate insulating material, for example of $SiO_2$, a metal layer 20 (of aluminum, for example) and finally a passivation layer 22 (of $SiO_2$). Section d finally is made along an addressing line: it shows substrate 10, ITO layer 12, a layer 13 of the first metal, layer 16 of aSi:H, insulating layer 18 (of $SiO_2$), layer 20 of the second metal and passivation layer 22.

FIG. 9 further shows two variant embodiments of the transistors. On part a provision is made against the disalignments of the masks in the vertical direction by giving rising strip Bi,j−1,j a rectangular end with a width greater than the width of the descending strip. On part b provision is further made against the disalignments in the horizontal direction, by clearing an opening in the blocks.

Thus, the appearance of spurious transistors which would result in projections of the descending strip in relation to the rising strip is avoided.

It will be observed that, in the embodiments that have just been described in connection with FIGS. 7 and 9, there is a spurious transistor extending between the median zone where the two transistors with a common source and upper line Li are. But such a transistor exhibits a very small W/L ratio of the width to the length, on the order of 0.1, which renders it practically harmless.

In all the embodiments which have just been described, the resistance connecting the source of the transistors to the following line consists of the deposited first conductive layer which is, for example, of ITO. This layer can exhibit a value greater than 10 k Ω per square, and for example 20 k Ω per square. The strip can have a length equal to 10 times its width, which corresponds to 10 squares, or a total resistance of 200 k Ω.

FIG. 10, part a, represents a lower plate according to the last variants illustrated (only a portion of the picture points are represented for simplification). The odd lines are connected to contacts 31, 33, 35, etc. located on the left of the display zone and the even lines to contacts 32, 34, 36, etc. located on the right of this zone. Contacts 40 located at the top and 50 located at the bottom of the display zone are used for the carry of the connections of the columns. These are illustrated in part b of FIG. 10. They consist, like the blocks, of a transparent conductor, for example of ITO with 100Ω per square.

The invention which has just been described can be combined with another arrangement which is the object of another patent application in the name of the same inventor, and filed on the same date as this application, and which specifies connecting the lines together by suitable resistances. In this way, if a line is cut, the isolated part of the line is not floating but brought to a potential equal to the half-sum of the potentials of the adjacent lines to which it is connected.

In conclusion, it must be emphasized that the position of the display elements is not necessarily the same from one line to the next. These elements can be shifted by a half-step, as illustrated in FIG. 11. The elements can then correspond to the display of three primary colors, red (R), green (V) and blue (B). Of course, the columns must match this staggered arrangement and exhibit appropriate set-backs of a half period, as shown in dashes in FIG. 11.

I claim:

1. Active matrix display screen comprising a first plate on which are deposited conductive blocks (Pij), control transistors (Tij) having a drain (D), a gate (G) and a source (S) and addressing conductive lines (Li) able to be connected to a line control circuit (CCL), the gates (G) of said transistors (Tij) being connected to said addressing lines (Li) and the drains (D) to said blocks (Pij), a second plate comprising addressing conductive columns (Cj) covering said blocks (Pij) of the first plate, and a liquid crystal inserted between said first and second plates, said screen being characterized by the fact that the source (S) of said transistor (Tij) whose gate (G) is connected to said addressing line (Li) of position i is connected to the adjacent addressing line (Li+1) of position i+1 by a resistance (Rij).

2. Display screen according to claim 1, wherein said resistance (Rij) has a value much greater than the output impedance of said line control circuits (CCL) and much less than the resistance of said transistors (Tij) when said transistors are conductive 3. Display screen according to claim 1, wherein said resistance which connects said source of a transistor to said addressing line consists of a strip (Bij) of conductive material deposited on said first plate and extending along said block.

4. Display screen according to claim 1, wherein said blocks (Pij) and said transistors (Tij) are placed symmetrically two by two, two symmetrical transistors (Ti,j−1, Ti,j) having a common source, a single conductive strip (Bi,j−1,j) connecting said common source to the adjacent addressing line (Li+1) and extending between two symmetrical blocks.

5. Display screen according to claim 4, wherein said transistors associated with said symmetrical blocks are placed between said two blocks, in the median part of said two blocks, the gates of said transistors being connected to said addressing line (Li) of position i by a first conductive strip (Gij) extending between said two blocks and the common source of said transistors being connected to the adjacent addressing line (Li+1) of position i+1 by a second strip (Bij) extending between said two blocks.

6. Process for making a display screen according to claim 1, wherein, to make the first plate, the following operations are performed:

depositing on an insulating substrate (10) a transparent conductive layer (12), a first photoengraving of said conductive layer defining conductive blocks (Pij) provided with projections and conductive strips (Bij) running along each block and each projection, depositing of a stack formed by a layer of hydrogenated amorphous silicon, a layer (18) of insulating material and a metal layer (20), a second photoengraving applied to said stack to form lines overlapping one of the ends of said conductive strips and said projections, transistors being constituted in these overlapping zones, depositing of a metal layer and a third photoengraving applied to said metal layer to allow to subsist other conductive bridges (Ki,j) making a connection between the other end of the conductive strips (Bi,j) and the adjacent addressing lines (Li+1).

7. Process for making a display screen according to claim 1, wherein, to make the first plate the following operations are performed:

depositing on an insulating substrate (10) a transparent conductive layer (12) and a layer of a first metal (13), a first photoengraving defining blocks (Pi,j), addressing lines (Li) and conductive strips (Bij) running along each block, these strips being connected at a first end to one of said adjacent addressing lines (Li+1), depositing of a stack formed by a layer (16) of hydrogenated amorphous silicon, an insulating material (18) and a second metal (20), the layer (16) of hydrogenated amorphous silicon and the layer (18) of insulating material stopping at the end of a line before the layer of the second metal, so that the latter comes in contact with the layer of the first metal, a second photoengraving applied to said stack allowing said stack to subsist on the lines and in the form of connecting strips (Gij) starting from a line (Li) and overlapping the second end of the conductive strip (Bij) and the projections of the blocks, said second photoengraving freeing the transparent conductive layer from the blocks and from the median part of the strips (Bij), each line thus comprising a transparent conductive layer and two superposed metal layers and in contact with one another at the end of a line.

* * * * *